United States Patent [19]

Ariga et al.

[11] Patent Number: 5,309,253
[45] Date of Patent: May 3, 1994

[54] IMAGE ENLARGEMENT/REDUCTION PROCESSOR AND METHOD

[75] Inventors: Toru Ariga; Naoyuki Echigo, both of Tokyo, Japan

[73] Assignee: Seiko Instruments Inc., Japan

[21] Appl. No.: 677,787

[22] Filed: Mar. 29, 1991

[30] Foreign Application Priority Data

Mar. 30, 1990 [JP] Japan ................................. 2-85955

[51] Int. Cl.⁵ ........................................... H04N 1/393
[52] U.S. Cl. ..................................... 358/451; 382/47
[58] Field of Search ................ 358/451, 448; 395/102, 395/127, 128; 382/44, 47; H04N 1/393

[56] References Cited

U.S. PATENT DOCUMENTS

| | | | |
|---|---|---|---|
| 4,633,503 | 12/1986 | Hinman | 358/451 |
| 4,878,126 | 10/1989 | Ichikawa | 358/451 |
| 4,937,677 | 6/1990 | van Dorsselaer | 358/451 |

*Primary Examiner*—Edward L. Coles, Sr.
*Assistant Examiner*—Jill Jackson
*Attorney, Agent, or Firm*—Pruce L. Adams; Van C. Wilks

[57] ABSTRACT

A picture element conversion system consists of a simple electric circuit for reducing or enlarging an image at high quality. The system includes a cumulative adding unit for cumulatively adding a multiplying factor, in synchronization with clock signals, and outputting the added data and a carry signal. A contiguous picture element output unit temporarily holds a picture element data array along one of two scanning directions and outputs at least two contiguous picture element data. A typical value calculation unit divides a section defined by the contiguous picture element data into sub-sections and obtains typical values corresponding to each sub-section from the picture element data output from the contiguous picture element output unit. A typical value selecting unit selects and outputs only one value from among the typical values output from the typical value calculation unit in accordance with the added data of the cumulative adding means, and a control unit controls the contiguous picture element output unit and the cumulative adding unit in accordance with the carry signal and an externally supplied selection data to determine whether a reduction conversion or an enlargement conversion should be carried out.

19 Claims, 5 Drawing Sheets

IMAGE ENLARGEMENT/REDUCTION PROCESSOR AND METHOD

BACKGROUND OF THE INVENTION

1. Field of the Invention

The present invention relates to an image enlargement and reduction processor, more particularly, to an image enlargement and reduction processor used in a picture image processing apparatus, such as a digital copy machine and a facsimile machine, and a method thereof.

2. Description of the Related Art

In a known conventional picture element conversion system, an optical system of a picture image reader is shifted in order to enlarge or reduce a scale of a picture image projected on an image sensor, whereby a picture element density read by the image sensor is converted. Further, in another known picture element conversion system, the picture element density is converted by an electrical method, whereby the picture element density is fixed when reading. As conventional electric methods, a most contiguous picture element substitution method, linear interpolation method, third dimension function convolution method, and so on are known. Among these methods, the known interpolation method has a high image quality. When an interpolation calculation is carried out according to the interpolation method, however, it is necessary to use various kinds of multipliers and dividers, or to use a ROM table.

According to the conventional picture element conversion system in which the optical system of the picture image reader is shifted, the system suffers from disadvantages such that the mechanism of the system is complicated. Also, to obtain enough light intensity in the case of an enlargement projection, it is necessary to make a light intensity of a light source irradiating a paper for reading high requiring a high consumption of electric power. On the other hand, according to another conventional picture element conversion system in which the picture element density is converted by the electrical method, the system suffers from the disadvantages set forth below. Namely, where the electrical system consists of a simple electric circuit, the image quality obtained after the conversion of the picture element density is poor. Further, where the electric system consists of various kinds of multipliers and dividers, the image quality is better but the electric circuit is inevitably large and complicated. Furthermore, where the electric system contains the ROM table, precision of a multiplying factor of the picture element density conversion is restricted in accordance with a capacity of the ROM, and it is substantially impossible to vary the multiplying factor on a fine scale.

SUMMARY OF THE INVENTION

An object of the present invention is to provide an improved image enlargement and reduction processor of a picture element conversion system using a simple electric circuit to obtain satisfactory image quality after conversion, and a method of using this system.

To achieve the objects set forth above, according to the present invention, a picture element density conversion system includes cumulative adding means for cumulatively adding picture data corresponding to a conversion multiplying factor of a density of picture elements which may be respectively graduated and are arranged in a matrix having two scanning directions, in synchronization with a clock signal along one of the two scanning directions, and for outputting added picture data and a carry signal. Contiguous picture element output means is provided for temporarily holding a picture element data array along one of the two scanning directions and outputting at least two contiguous picture element data. Typical value calculation means is provided for dividing a section defined by said contiguous picture element data into a plurality of sections and obtaining a plurality of typical values corresponding to each section from the picture element data output from said contiguous picture element output means. Typical value selecting means is provided for selecting and outputting only one value from among the typical values output from the typical value calculation means, in accordance with the added data of the cumulative adding means. Also, control means is provided for controlling an output of the typical value selecting means and an output of the contiguous picture element output means, in accordance with the carry signal and selection data from an external setting means to discriminate whether a reduction operation or an enlargement operation should be carried out.

Further, according to the present invention, there is provided a method of converting a picture element density, comprising the step of adding data on the basis of a conversion multiplying factor of a density of picture elements which may be respectively graduated and are arranged in a matrix having two scanning directions, in synchronization with a clock signal along one of the two scanning directions to produce added picture data and a carry signal. Temporarily holding a picture element data array along one of the two scanning directions. Outputting at least two contiguous picture element data from among the data array. Dividing a section defined by the contiguous picture element data into a plurality of sections. Obtaining a plurality of typical values corresponding to each section from the picture element data. Selecting only one value from among the typical values output from the typical value in accordance with the added data of the adding step; and outputting the selected typical value, in accordance with the carry signal and selection data from an external setting means, to discriminate whether a reduction operation or a enlargement operation should be carried out.

BRIEF DESCRIPTION OF THE DRAWINGS

Other objects and features of the present invention will be described in more detail with reference to the accompanying drawings, in which.

DETAILED DESCRIPTION OF THE INVENTION

Figure 1:
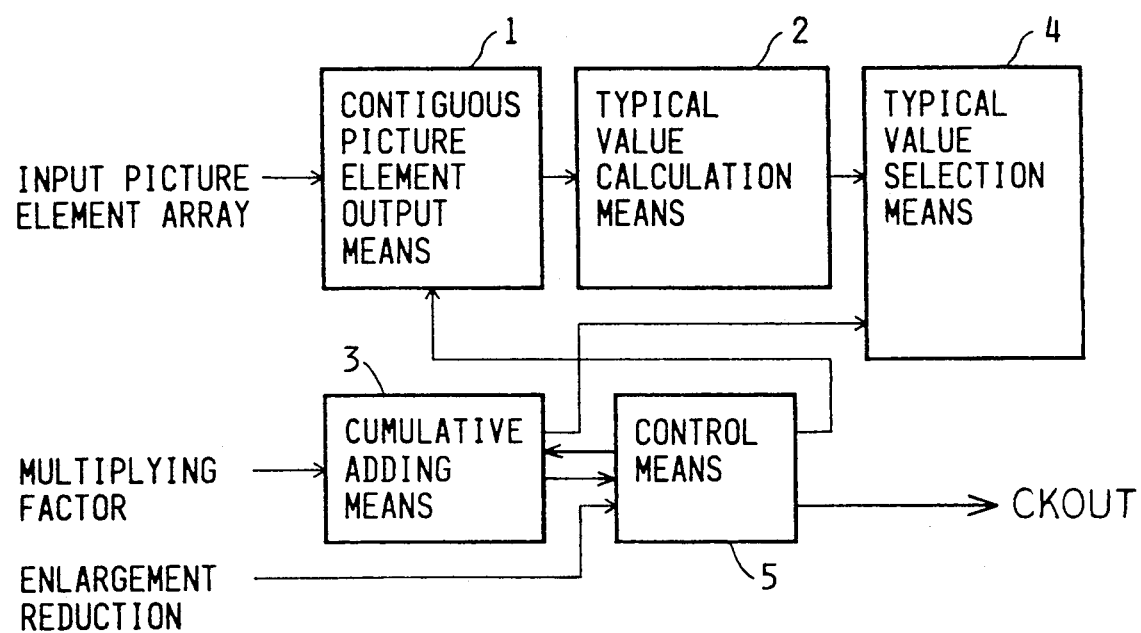
FIG. 1 is a block diagram of a preferred embodiment of the present invention.

A block diagram of an image enlargement and reduction processor in accordance with the present invention is shown in FIG. 1. Cumulative adding means 3 is provided for cumulatively adding picture data K (described below) obtained on the basis of a conversion multiplying factor r (described below) of a density of picture elements arranged in a matrix having two scanning directions. The picture data is added in synchronization with a clock signal generated along one of the two scanning directions. The cumulative adding means 3 outputs the added picture data and a carry signal. Contiguous picture element output means 1 temporarily holds a picture element data array along one of the two scanning directions and outputs at least two contiguous picture element data. Typical value calculation means 2 divides a section defined by the contiguous picture element data into a plurality of sub-sections and obtains typical values corresponding to each sub-section from the contiguous picture element data. Typical value selection means 4 selects and outputs only one value from among the typical values output from the typical value calculation means 2 in accordance with the added picture data. Control means 5 controls the output of the contiguous picture element output means 1 and the addition of the cumulative adding means 3 in accordance with the carry signal and a selection data (enlargement/reduction) received from an external setting means (not shown) for selecting either a reduction or an enlargement operation.

Figure 2:
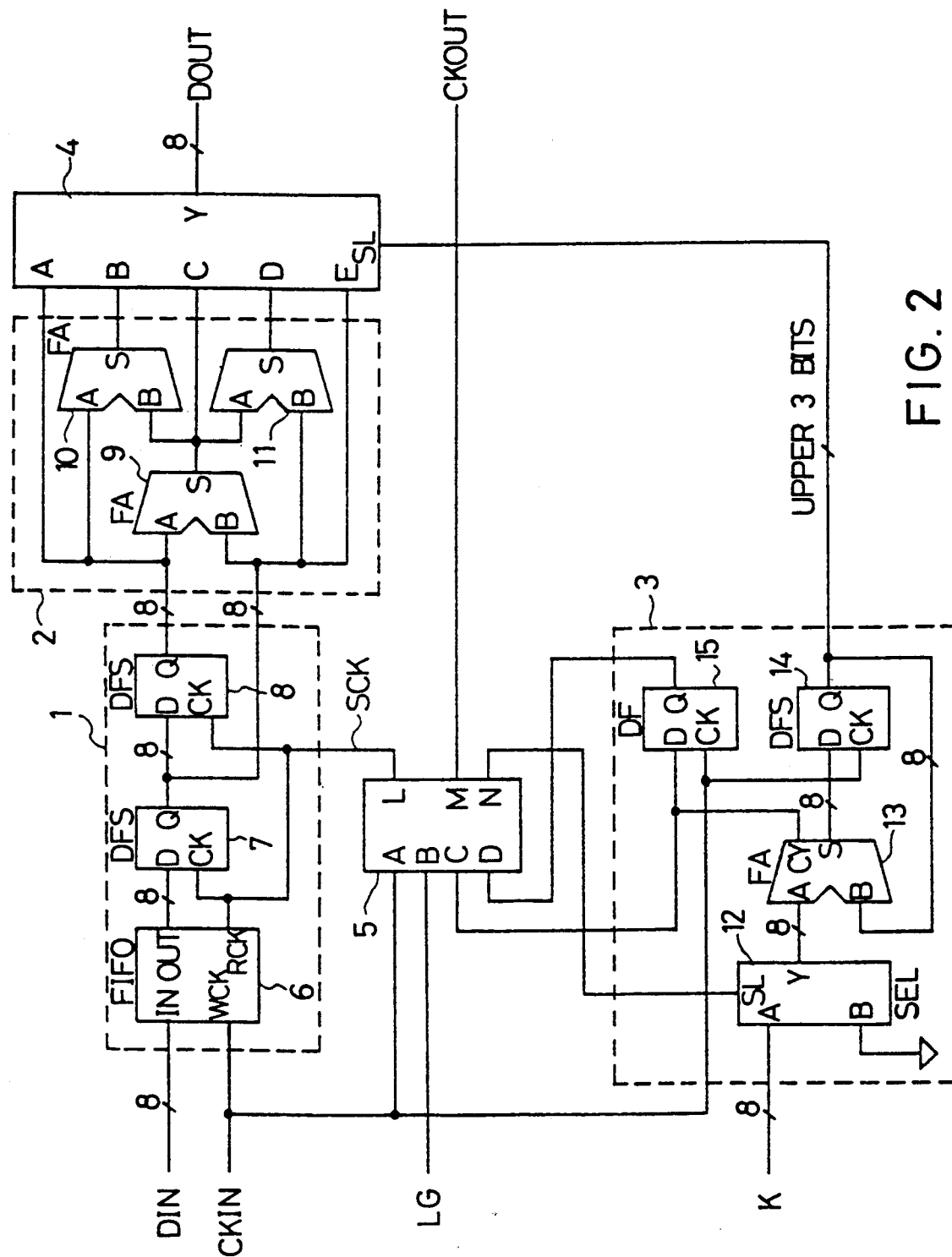
FIG. 2 is a schematic diagram showing a circuit able to carry out a picture element density conversion of picture element data arrays along a main scanning direction, in accordance with a preferred embodiment of the present invention.

In an embodiment shown in FIG. 2, the contiguous picture element output means 1 comprises a first-in.first-out memory (FIFO) 6 and eight bit D type flip.flops (DFS) 7 and 8. In the preferred embodiment described below, eight bit type picture element data array (DIN) are input to a system of the embodiment, in synchronization with an input clock signal (CKIN). The FIFO 6 reads and holds the DIN which is a data array input to a terminal IN of the FIFO 6, when a rising edge of the clock signal CKIN is input to a writing clock terminal WCK of the FIFO. At the same time, the FIFO 6 outputs in turn the oldest data held in the FIFO, in synchronization with a clock CK input to a reading clock terminal RCK. The DFS 7 and 8 read and hold output signals consisting of eight bits output from the FIFO 6 or the DFS 7 as input signals for the DFS 7 or the DFS 8, in synchronization with each clock signal SCK input to each clock terminal CK. Consequently, the DFS 7 and 8 always hold two consecutive and contiguous picture element data and the contiguous picture element output means 1 outputs the data to a typical value calculating means 2.

In the embodiment of FIG. 2, the typical value calculating means 2 comprises three eight bit type full adders 9, 10 and 11. Each full adder adds eight bit data input to terminals A and B, and outputs calculated data from each terminal S as a half value of the added data, by shifting one bit. Note, when the picture element data output from the terminal Q of the DFS 8 is $d_{i,j}$ and picture element data from the terminal Q of the DFS 7 is $d_{i,j+1}$, the typical value calculating means 2 outputs five kinds of data including the data output from the DFS 7 and 8, and inputs the five kinds of data to input terminals A, B, C, D and E of a typical value selecting means 4. The data output from the typical value calculating means 2 is obtained by calculating the following formulas.

Data input to the terminal A: $DA_{i,j}$ $$DA_{i,j}=d_{i,j} \qquad \text{(Formula 1)}$$

Data input to the terminal E: $DE_{j,i}$ $$DE_{i,j}=d_{i,j+1} \qquad \text{(Formula 2)}$$

Data input to the terminal C: $DC_{i,j}$ $$DC_{i,j}=(d_{i,j}+d_{i,j+1})/2 \qquad \text{(Formula 3)}$$

Data input to the terminal B: $DB_{i,j}$ $$DB_{i,j}=(d_{i,j}+DC_{i,j})/2 \qquad \text{(Formula 4)}$$

Data input to the terminal D: $DD_{i,j}$ $$DD_{i,j}=(DC_{i,j}+d_{i,j+1})/2 \qquad \text{(Formula 5)}.$$

Figure 3:
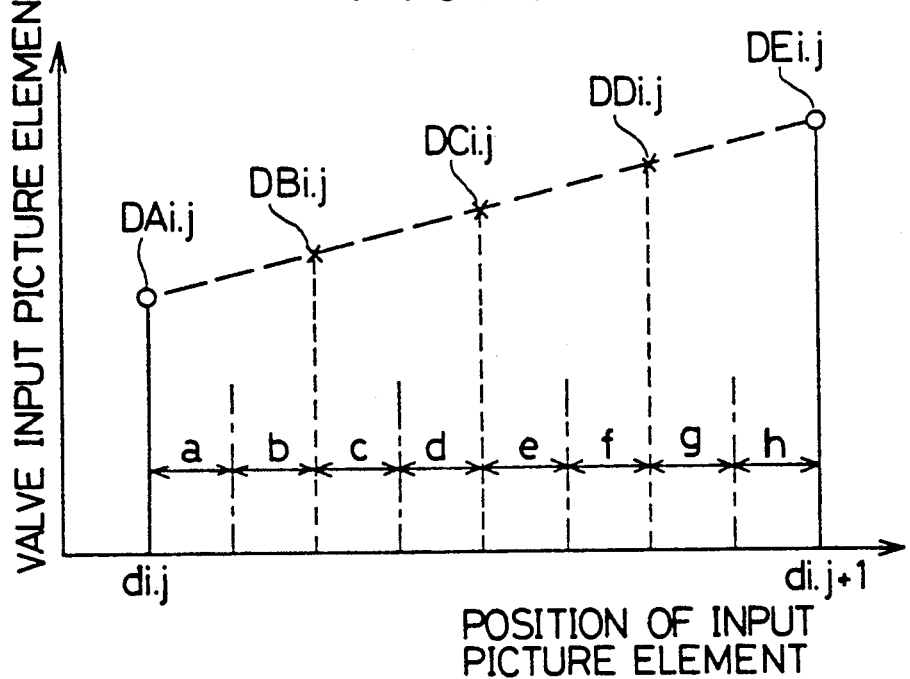
FIG. 3 is a schematic graph showing typical values.

The formulas show that the data output from the typical value calculating means 2 designate two values which are both end values between sections defined by two adjacent (contiguous) picture elements input to the typical value calculating means 2, and three values obtained by dividing the section into four sub-sections by a linear interpolation method. The relationship between the output data, which are typical data input to the typical value selecting means 4, are shown in FIG. 3.

In the embodiment of FIG. 2, the cumulative adding means 3 comprises an eight bit type selector(SEL) 12 having two input terminals and one output terminal, a full adder (FA) 13, an eight bit D type flip.flop (DFS) 14, and a one bit D type flip.flop (DF) 15. The SEL 12 outputs data input from a terminal A, when a signal 0 is input to an input terminal SL, and selectively outputs data input from a terminal B when a signal 1 is input to the input terminal SL. According to this embodiment, factor K, which is picture data dependent on a conversion multiplying factor of the picture element density and consists of eight bits, is input to the terminal A of the SEL 12 from outside of the system. The factor K is obtained by calculating the following formula.

For a reduction:

$$K=(1/r-1)*100 \text{ H } 0.5<r\leq 1 \qquad \text{(Formula 6)}$$

For a enlargement:

$$K=(1/r)*100 \text{ H } r>1 \qquad \text{(Formula 7)}.$$

In the formula, "r" represents a multiplying factor of the picture element density conversion, and "H" represents a hexadecimal digit.

A ground electric potential is input to the input terminal B of the SEL 12, which is equivalent to the signal 0. The input data input to the SEL 12 is output from a terminal Y in accordance with the signal input to the terminal SL of the SEL 12. The FA 13 adds data output from the output terminal Y of the SEL 12 and data output from an output terminal Q of the DFS 14, and outputs the added data from an output terminal S of the FA. At the same time, the FA 13 outputs a carry signal (CY) as a signal 1 showing the presence of a carry, from a terminal CY, where value of the added data is not less than 100 H ("H" represents a hexadecimal digit), because the FA 13 outputs only the lower eight bits as the added data from the terminal S. The DFS 14 and DF 15 read and hold the data S or CY output from the FA when a rising edge of clock CKIN is input to a terminal CK of the DFS 14 or DF 15. The DFS 14 outputs the held data from a terminal Q, so that all of the output data consisting of eight bits is input to the terminal B of the FA 13 and the upper three bits data of the output data are input to the typical value selecting means 4. Namely, as described above, the present cumulative adding means 3 repeats the afore-mentioned operation, in synchronization with the clock signal CKIN.

In the above-mentioned formulas 6 and 7, a reciprocal of "r" (1/r) represents a period of a picture element signal array, and the 100 H is multiplied by the 1/r or the (1/r−1) to normalize a period of the output data. Namely, the cumulative adding means 3 can provide output data with a precision of eight bits from the terminal S of the FA 13, which bits show a position of the output picture elements data in an objective interpolation section in order to obtain picture element signal output, by repeatedly adding the period of output picture element signal, provided that the period of the input picture element array is 100 H. Further, where the carry output signal CY is the signal 0, the signal 0 means that a position of an output picture elements data exists in an objective section of an interpolation calculation. On the other hand, where the carry output signal CY is signal 1, the signal 1 means that an objective section of the interpolation calculation to obtain the position of the output picture elements data is a next section to be calculated.

In the embodiment of FIG. 2, the typical value selecting means 4 comprises an eight bit type selecting circuit having five input terminals and one output terminal, a control terminal SL. the signals consisting of three bits are input to a terminal SL of the selecting means 4. These signals are output from the DFS 14 of the cumulative adding means 3, and are used as selecting signals. Note, the selecting signals consist of the upper three bits of a signal Q output from the output terminal Q of the DFS 14. Examples of signals Y output from the typical value selecting means 4 are shown in Table 1, wherein the upper three bits of the output signals Q are b7, b6 and b5, respectively, from the upper side.

TABLE 1

| b7 | b6 | b5 | : | output signals Y |
|---|---|---|---|---|
| 0 | 0 | 0 | : | input signal A |
| 0 | 0 | 1 | : | input signal B |
| 0 | 1 | 0 | : | input signal B |
| 0 | 1 | 1 | : | input signal C |
| 1 | 0 | 0 | : | input signal C |
| 1 | 0 | 1 | : | input signal D |
| 1 | 1 | 0 | : | input signal D |
| 1 | 1 | 1 | : | input signal E |

The output signals Q of the DFS 14 are output, but the output signals S of FA 13 remain unchanged. The output signals Q mean positions of picture element outputs in the sections to be interpolation calculated. Namely, according to the upper three bits of the output signals Q, the objective section is divided into eight sub-sections, from "a" to "h", and it is possible to decide in which sub-section the picture element output is positioned.

In the embodiment of FIG. 2, reference numeral 5 represents a control means. The control means 5 is designed to be adapted to the following truth map(Table 2).

TABLE 2

| INPUT | | | | | OUTPUT | | |
|---|---|---|---|---|---|---|---|
| A | B | C | D | : | L | M | N |
| 0 | 0 | X | 0 | : | 0 | 0 | 0 |
| 1 | 0 | X | 0 | : | 1 | 1 | 0 |
| 0 | 0 | X | 1 | : | 0 | 1 | 1 |
| 1 | 0 | X | 1 | : | 1 | 1 | 1 |
| 0 | 1 | 0 | X | : | 1 | 0 | 0 |
| 1 | 1 | 0 | X | : | 1 | 1 | 0 |
| 0 | 1 | 1 | X | : | 0 | 0 | 0 |
| 1 | 1 | 1 | X | : | 1 | 1 | 0 |

The clock signal CKIN is input to a input terminal "A" and a signal LG is input to a input terminal "B". The signal LG is 1 in the case of an enlargement conversion and is 0 in the case of a reduction conversion. The carry output signal CY is input to a terminal "C" and the output signal Q of the DF 15 is input to a terminal "D". The signal Q is identical to the signal CY input from the FA when the rising edge of the clock CKIN is input to the DF 15. The output signal L of the output terminal "L" is input to the FIFO 6 and the DFS 7 and 8 as a clock signal SCK, in order to transfer data in the contiguous picture element output means 1. An output signal M of the output terminal "M" is a clock signal CKOUT which provides a timing signal for the output of converted data from the present system. The output signal N of the output terminal "N" is input as selecting signals SL to the terminal SL of the SEL 12 of the cumulative adding means 3.

The operation of the control means 5 will be described below in accordance with the truth map (Table 2).

When the input signal B (LG) is 0 (LG=0), i.e., in the case of a reduction conversion, the output signal L (SCK) is identical to the input signal CKIN input to the input terminal "A". In the case of a reduction conversion, as more than two output data can not be obtained in the same section of the contiguous picture elements, the contiguous means 1 must always output the contiguous picture element data in the next section, in synchronization with the signal CKIN. Further, in the case of the reduction conversion, no output data is produced in specific sections of the contiguous picture elements, and thus some of the outputs are eliminated. This elimination condition can be determined by the output signal Q of the DF 15 of the cumulative adding means 3, which is repeatedly adding periods of picture element data input to the input terminal D of the control means 5. In another words, since the output signal Q of the DF 15 is identical to a carry signal CY input from the FA 13 to the DF 15 at the time of a clock signal CKIN, the existence of a carry signal after the adding calculation by the FA 13 means that there is no data to be output in the section defined by the contiguous picture elements which are to be interpolation calculated now, and thus the data to be output exist in the next section. Accordingly, in the case of a reduction conversion, a signal 1 is output from the terminal M of the control means 5, in order to inhibit the output of the clock signal CKOUT, if the input signal D (output signal of the DF 15) of the control means 5 is 1. At the same time, the output signal N of the control means is input as a signal 1 to the input terminal SEL of the SEL 12, in order to output a signal 0 from the terminal Y of the SEL 12 denoting that the multiplying factor K is not to be added, because the DFS 14 of the cumulative adding means 3 has already held the data showing positions of the output data in the next section.

The operation of the control means 5 in the case of an enlargement conversion will be described below.

In the case of an enlargement conversion, since the period of the picture element array to be output is shorter than that of the picture element array input, at least more than one output data can be obtained in a section defined by contiguous picture elements. Accordingly, different to a reduction conversion, in this case, the output clock signal CKOUT is always output, in synchronization with the clock signal CKIN, and the cumulative adding means 3 continues to add the multiplying factor K, in synchronization with the clock signal CKIN. In the case of an enlargement conversion, the output signal M (CKOUT) output is identical to the signal A (CKIN) and the output signal N is output as a signal 0 so that the SEL 12 selects the multiplying factor K. On the other hand, the output signal L output as a signal SCK is always kept at 0, in order to repeatedly calculate the same contiguous picture element data until a carry is produced in the FA 13 of the cumulative adding means 3, which shows that it is necessary to obtain the data in the next section of the contiguous picture element data. Namely, only when the carry signal is produced and is input to the terminal D of the control means 5 as a signal 1, is the output signal L output as a signal 0 in order to output the clock signal SCK, in synchronization with the clock signal CKIN.

The afore-mentioned operation will be described with reference to the timing chart.

Figure 4:
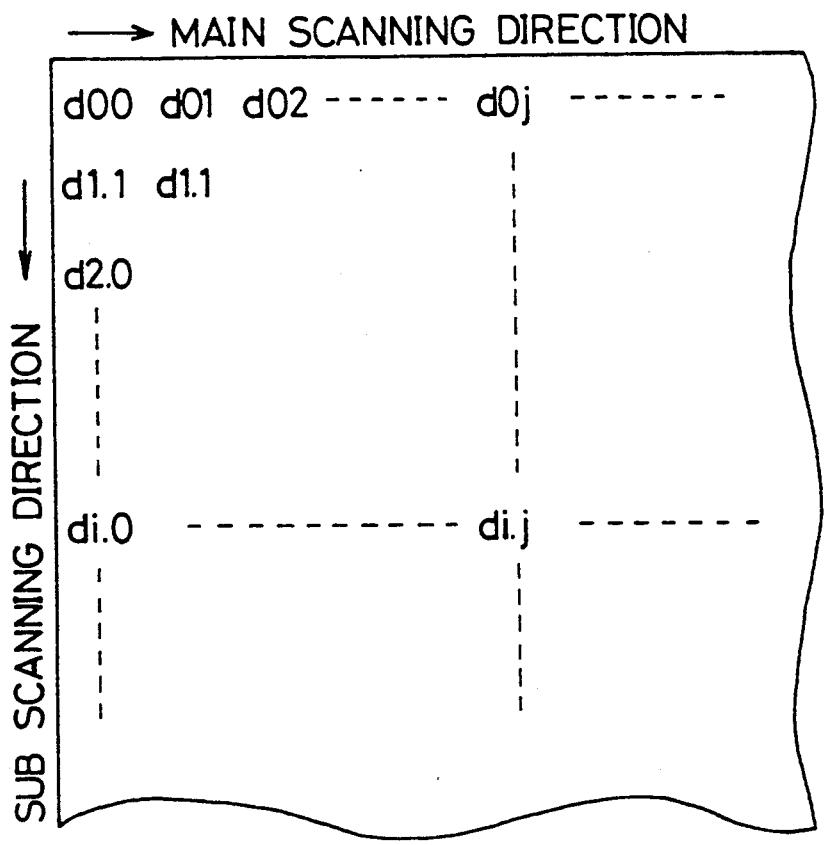
FIG. 4 is a schematic diagram of an input picture element array.

FIG. 4 shows an example of a picture element data array as a matrix having "i" lines and "j" columns, which is input as signals DIN to the present system of the embodiment. The input signals DIN are graduated, respectively. In the following description, the picture element density conversion method of the present invention is adapted to the picture element array of the "i" line along the main scanning direction. First, the case of a reduction conversion of the picture element density will be described.

Figure 5:
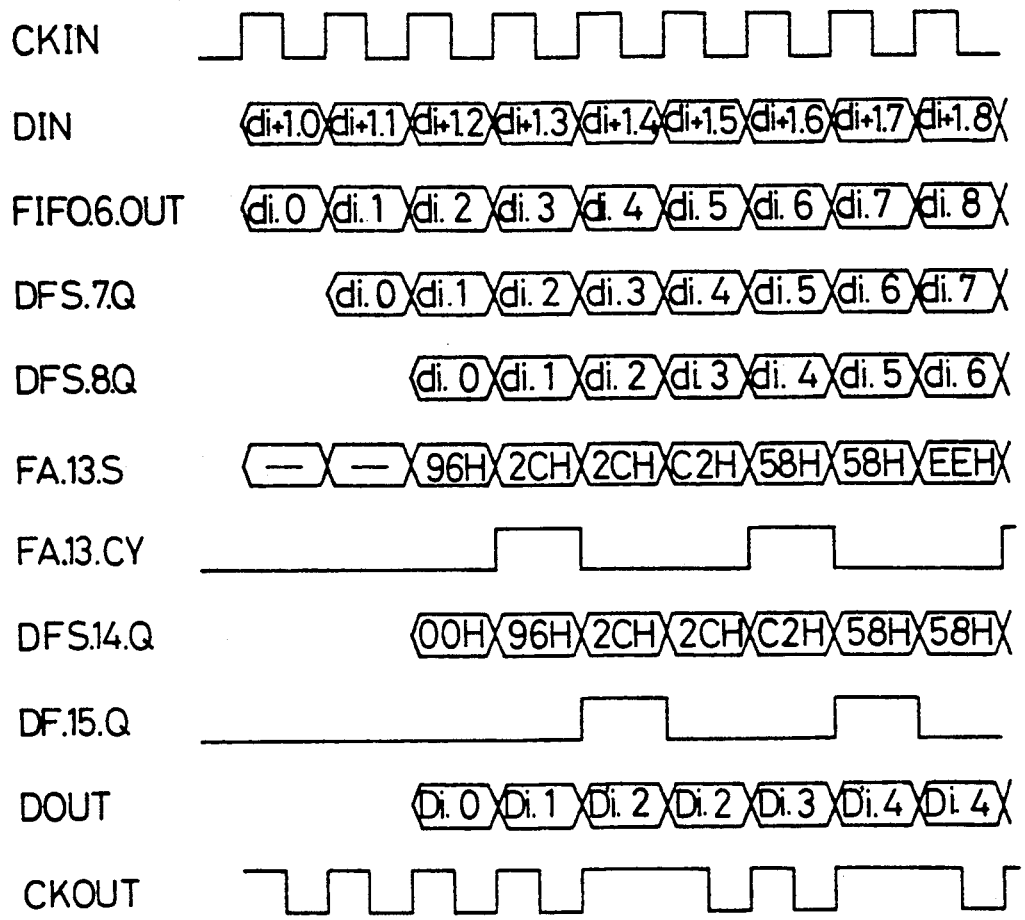
FIG. 5 is a timing chart showing a method of a picture element density reduction conversion.
Figure 6:
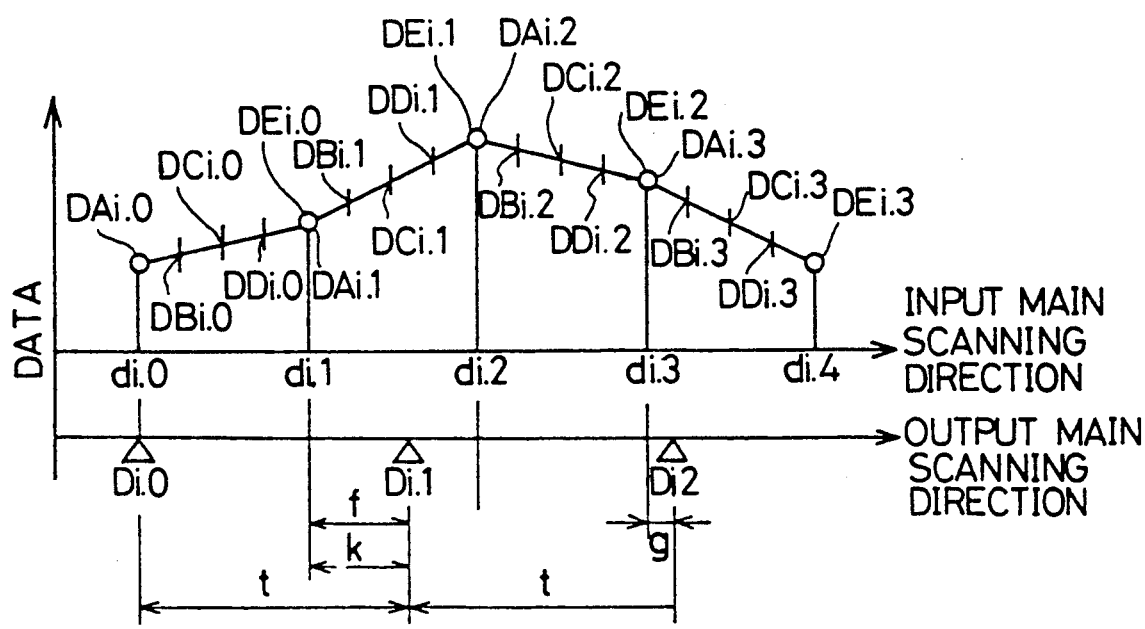
FIG. 6 is a schematic graph showing a relationship between input data and output data of a picture element data array in the case of a reduction conversion.

FIG. 5 is a timing chart showing the operation of a reduction conversion. Considering a timing point in which $d_{i+1,2}$ as a data DIN is input, the output data of the FIFO 6 is $d_{1,2}$ which has the same column as the data and one previous line compared with the data DIN, and the output data of the DFS 7 and 8 are $d_{i,o}$, respectively which are respectively, shifted data of the output data of the FIFO 6. Accordingly, the typical value calculation means 2 reads the output data of the DFS 7 and 9 and outputs the five kinds of data shown in Formulas 1 to 5 to the typical value selecting means 4, as typical values. As shown in FIG. 6, which shows a relationship between the input and output picture element data, the typical values are shown as $DA_{i,o}$, $DB_{i,o}$, $DC_{i,o}$, $DD_{i,o}$ and $DE_{i,o}$, respectively. Here, when the multiplying factor K is 96 H, this shows a reduction of about 63% in accordance with the Formula 6. In this case, if the output signal of the DFS 14 of the cumulative adding means 3 is 0, a position of the output data $D_{i,o}$ in comparison with the input picture element data array is identical to that of the data $DA_{i,o}$, i.e., input data $d_{i,o}$, and the data $DA_{i,o}$ is output from the typical value selecting means 4. On the other hand, the FA 13 of the cumulative adding means 3 adds the multiplying factor K and the output data 0 of the DFS 14, and outputs the data of 96 H. Accordingly, the output data of the DFS 14 becomes 96 H at the next clock timing on the basis of the clock signal CKIN. In this case, the output data of the DFS 7 and 8 becomes $d_{i,2}$ and $d_{i,1}$, respectively, in the same manner and this data is input to the typical value calculation means 2, and thus five new kinds of typical values are input to the typical value selecting means 4. These five new kinds of typical values are $DA_{i,1}$, $DB_{i,1}$, $DC_{i,1}$, $DD_{i,1}$ and $DE_{i,1}$ shown in FIG. 6, and the selecting means 4 selects an output data from among these values $D_{i,1}$ and outputs the same. In FIG. 6, "t" means the period of the picture element data to be output, and corresponds to 1/r shown in the Formula 6. Further, the multiplying factor K defined by the Formula 6 corresponds to a value "k" shown in FIG. 6, which is obtained by subtracting a period of the input picture element data array from the period "t". The selection operation by the selecting means 4 is carried out in accordance with a position deviation "f" (shown in FIG. 6) of the output data $D_{i,1}$ existing between the input picture element data array $d_{1,2}$ and $d_{i,1}$, on the basis of Table 1. At this time, if the output data of the DFS 14 is 0 at the previous clock timing, as mentioned above, the position deviation "f" is identical to the value "k" and the multiplying factor K (f=k=K). According to Table 1, a position of the output data $D_{i,1}$ having the deviation "f" is in the sub-section "e" shown in FIG. 3, and thus the output data $DC_{i,1}$ is output. Further, at this time, the FA 13 adds the multiplying factor K (96 H) and the output data (96 H) of the FA 14, whereby the output data S becomes 2CH and the carry signal CY is made 1 (S=2CH and CY=1).

The formula CY=1 means that there is no data $D_{i,2}$ to be output in a sub-section defined by data $d_{i,3}$ and $d_{i,2}$, which is a sub-section to be interpolation calculated now as shown in FIG. 6, and means that the data $D_{3,2}$ exists in the next sub-section defined by data $d_{i,4}$ and $d_{i,2}$. Accordingly, in this case, the output clock signal CKOUT is not output. Further, in this case, as a value of the output data S of the FA 13 designates a position deviation "g" of the output data $D_{i,2}$, the carry output data CY is held by the DF 15 at the next clock timing, and the control means 5 reads the data CY and outputs a signal 0 as the output data N which is input to the terminal SL of the SEL 12, in order to stop the cumulative adding calculation of the multiplying factor K, and thus the cumulative adding means 3 adds the signal 0.

As mentioned above, according to the present system, a reduction conversion is accomplished by controlling the output clock signal and carrying out a cumulative adding calculation of the multiplying factor in accordance with the output data of the DF 15 holding the output data CY of the FA 13.

The operation of the embodiment of the present system in the case of an enlargement conversion will be described below.

Figure 7:
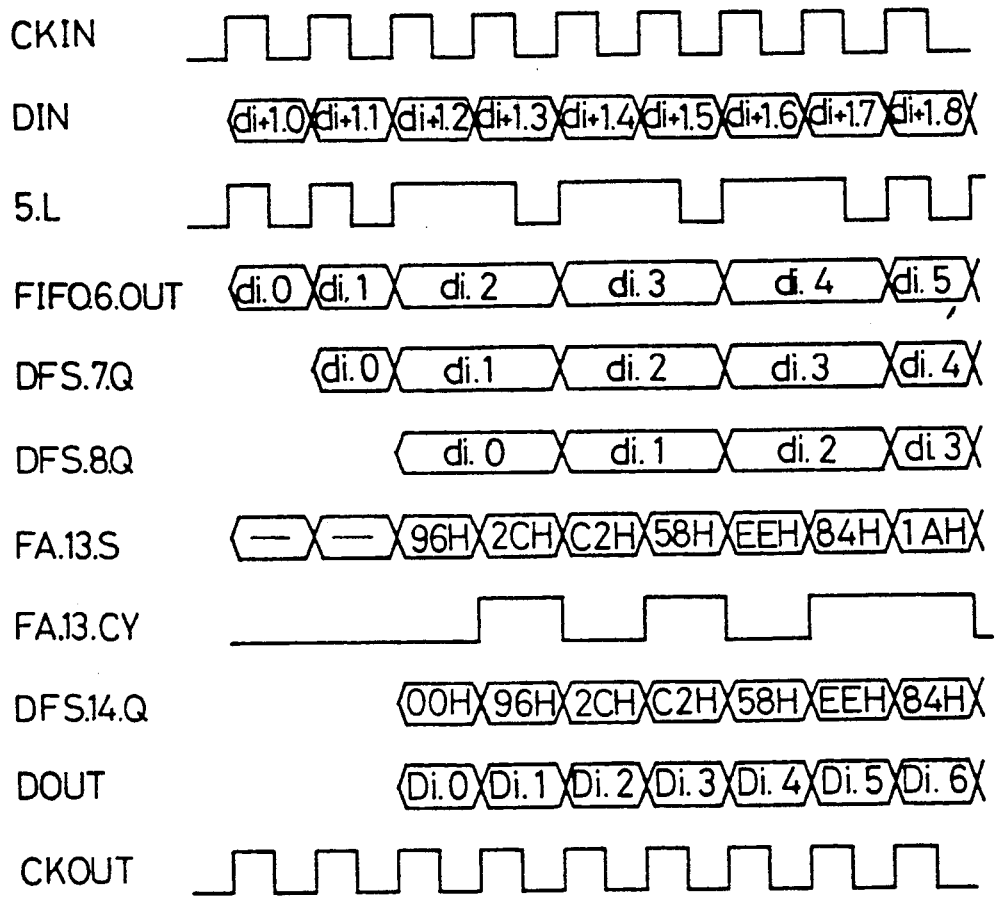
FIG. 7 is a timing chart showing a method of a picture element density enlargement conversion.
Figure 8:
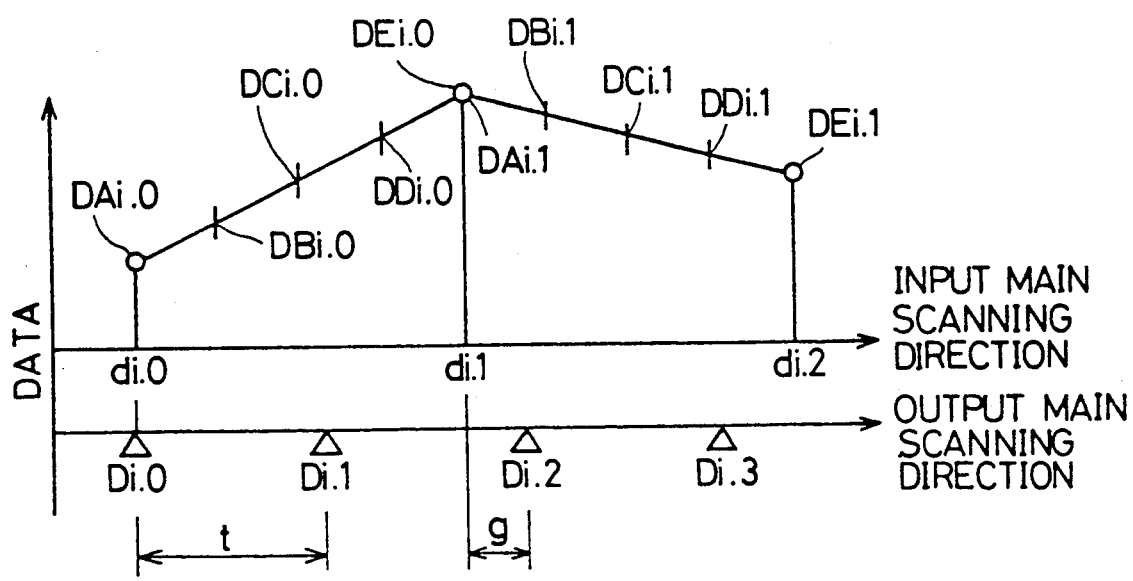
FIG. 8 is a schematic graph showing input data and output data of a picture element data array in the case of an enlargement conversion.

FIG. 7 is a timing chart showing the enlargement conversion according to this embodiment. In the following description, the input data DIN is the data $d_{i+1,2}$ as in the case of the reduction conversion. Further, when that the multiplying factor K is 96 H, which means an enlargement of about 170%, and the output data of the DFS 14 is signal 0, the data $d_{i,1}$ and $d_{i,0}$ showing a interpolation sub-section output by the contiguous picture element output means 1 as in the case of a reduction conversion. At this time, the FA 13 adds the multiplying factor K (96 H) and the output data (0) and outputs the added data 96 H as the output data S of the FA 13. As the adding process does not produce the carry signal, it shows that data $D_{3,1}$ to be output at the next timing is output from the sub-section which is the object to be interpolation calculated now, as shown in FIG. 8. In FIG. 8, "t" means a period of an output picture element array and corresponds to 1/r of the Formula 7. The control means 5 inhibits an output of signal SCK to prevent a shift of data of the FIFO 6, the DFS 7 and the DFS 8, so that the present contiguous picture element data is held in them. Accordingly, a typical value is obtained and selected to be output in the same sections defined by the contiguous picture element data $d_{2,1}$ and $d_{2,0}$ even at the next clock timing. Note, the selecting process is not described because it is carried out in the same manner as for a reduction conversion.

At the next clock timing, output data is calculated from the contiguous picture element data $d_{i,1}$ and $d_{i,0}$ according to the data 96 H held by the DFS 14, and at the same time, the FA 13 adds the multiplying factor K and the data 96 H of the DFS 14. Consequently, data "C 2 H" is produced as output data S and a carry signal CY is produced at the same time. This production of the carry signal CY means that the data $D_{i,2}$ is to be obtained in the next sub-section defined by contiguous picture element data $d_{i,2}$ and $d_{i,1}$. The control means 5 outputs a signal L (clock signal SCK) in accordance with the carry signal and shifts the data of the FIFO 6, the DFS 7 and the DFS 8 to renew the contiguous picture element data, as shown in the timing chart of FIG. 7. In this case, the output data S of the FA 13 corresponds to "g" of FIG. 8 and is a reference value used when selecting the typical value.

As mentioned above, in the case of an enlargement conversion, the present system is operated to output the data with reference to the output data of the DFS 14, and renews the input picture element array according to the output signal CY of the FA 13.

The above description is devoted to the operation of the embodiment for converting a picture element density along the main scanning direction of the picture element data array by an approximation method, to thereby obtain a typical value using a linear interpolation method, but the present invention is not limited to such an embodiment and can be applied to other picture element density conversion systems. For example, the present invention can be applied to a system for converting the picture element density along the sub scanning direction of the picture element data array, by modifying the clock signals (CKIN, CKOUT) of the above-mentioned embodiment to form line synchronized signals. Further, the approximation method is not limited to the linear interpolation method, but can be applied to all methods by which a typical value can be obtained.

Many widely different embodiments of the present invention may be constructed without departing from the spirit and scope of the present invention, and thus it should be understood that the present invention is not restricted to the specific embodiments described above.

We claim:

1. An image enlargement and reduction processor, comprising:
   cumulative adding means for cumulatively adding picture data obtained on the basis of a conversion multiplying factor of a density of picture elements which are arranged in a matrix having two scanning directions, in synchronization with a clock signal generated along one of the two scanning directions, and for outputting added picture data and a carry signal;
   contiguous picture element output means for temporarily holding a picture element data array along one of the two scanning directions and outputting at least two contiguous picture element data;
   typical value calculation means for dividing a section defined by said contiguous picture element data into a plurality of sub-sections and obtaining typical values corresponding to each sub-section from the contiguous picture element data output from said contiguous picture element output means;
   typical value selecting means for selecting and outputting only one value from among the typical values output from said typical value calculation means in accordance with the added picture data from said cumulative adding means; and
   control means for controlling an output of said contiguous picture element output means and an addition of said cumulative adding means in accordance with selection data given from an external setting means for selecting a reduction or an enlargement operation and in accordance with the carry signal output from said cumulative adding means.

2. An image enlargement and reduction processor according to claim 1, wherein said picture data is obtained by the following formula;
   for a reduction conversion:

$$K = (1/r - 1) * 100 \text{ H } 0.5 < r \leq 1$$

for an enlargement conversion:

$$K = (1/r) * 100 \text{ H } r > 1$$

where, "r" represents the conversion multiplying factor of the picture element density, and
"H" represents a hexadecimal digit.

3. An image enlargement and reduction processor according to claim 1, wherein said cumulative adding means comprises a selector for selecting either the picture data or zero value data according to an output signal from the control means,
   a full adder for adding cumulatively data output from the selector and outputting the cumulative picture data and the carry signal,
   a D type flip.flop for holding the cumulative data from the full adder and outputting the cumulative data to the typical value selecting means, and
   a D type flip.flop for holding the carry signal input from the full adder and outputting the carry signal to the control means.

4. An image enlargement and reduction processor according to claim 1, wherein said contiguous picture element output means comprises a first-in.first-out memory into which the input picture element data array is input in synchronization with said clock signal, and two D type flip.flops which hold the picture element data, respectively, which are contiguous picture element data output from the first-in.first-out memory and output the data to the typical value calculation means in synchronization with another clock signal output from said control means.

5. An image enlargement and reduction processor according to claim 1, wherein said typical value calculating means comprises a plurality of full adders which produce the typical values from the contiguous picture element data output from said contiguous picture element output means using a linear interpolation method.

6. An image enlargement and reduction processor according to claim 1, wherein said typical value selecting means comprises a selecting circuit having a plurality of terminals and one output terminal from which only one value from among the typical values is output after selection in accordance with the added picture data output from said cumulative adding means.

7. An image enlargement and reduction processor according to claim 1, wherein said control means has an input terminal to which the selection data for determining whether a reduction conversion or an enlargement conversion should be carried out is input and an input terminal to which the carry signal output from said cumulative adding means is input.

8. A method of enlarging or reducing an image, comprising the steps of:
adding picture data on the basis of a conversion multiplying factor of a density of picture elements which are arranged in a matrix having two scanning directions, in synchronization with a clock signal along one of the two scanning directions, to produce added picture data and a carry signal;
temporarily holding a picture element data array along one of the two scanning directions;
outputting at least two contiguous picture element data among the data array;
dividing a section defined by said contiguous picture element data into a plurality of sub-sections;
obtaining typical values corresponding to each sub-section from the picture element data;
selecting only one value from among the typical values in accordance with the added data of the adding step; and
outputting the contiguous picture element data and adding the picture data in accordance with the carry signal and selection data for determining whether a reduction conversion or an enlargement conversion should be carried out.

9. A method of enlarging or reducing an image according to the claim 8, wherein the dividing step is carried out using a linear interpolation method.

10. An image enlargement and reduction processor, comprising: cumulative adding means for cumulatively adding picture data, the picture data being dependent on a conversion multiplying factor of a density of picture elements arranged in a matrix having two scanning directions, and for outputting added picture data and a carry signal; contiguous picture element output means for temporarily holding a picture element array along one of the two scanning directions and outputting at least two contiguous picture element data; typical value calculation means for dividing the contiguous picture element data into sub-sections and obtaining typical values corresponding to each sub-section; typical value selecting means for selecting and outputting only one value from the typical values dependent on the added picture data; and control means for controlling the output of the contiguous picture element output means and the addition of the picture data by the cumulative adding means dependent on the carry signal and externally supplied selection data.

11. An image enlargement and reduction processor according to claim 10; wherein the two scanning directions include a main scanning direction and a sub-scanning direction, and the picture data is added in synchronization with a clock signal generated dependent on the main scanning direction.

12. An image enlargement and reduction processor according to claim 10; wherein the two scanning directions include a main scanning direction and a sub-scanning direction, and the picture data is added in synchronization with a clock signal generated dependent on a line synchronized signal dependent on the sub-scanning direction.

13. An image enlargement and reduction processor according to claim 10; wherein the picture data is obtained dependent on a reduction conversion formula $K=(1/r-1)\times 100H$, with $0.5<r\leq 1$, and on an enlargement conversion formula $K=(1/r)\times 100H$, with $r>1$, where "K" represents the picture data, "r" represents the conversion multiplying factor of the picture element density and "H" represents a hexadecimal digit.

14. An image enlargement and reduction processor according to claim 10; wherein the cumulative adding means includes selecting means for selecting either the picture data or zero value data according to an output signal from the control means, a full adder for cumulatively adding data output from the selecting means and outputting the added picture data and the carry signal, a D type flip.flop for holding the added data and outputting the added data to the typical value selecting means, and a D type flip.flop for holding the carry signal and outputting the carry signal to the control means.

15. An image enlargement and reduction processor according to claim 10; wherein the contiguous picture element output means comprises a first-in.first-out memory receptive of the picture element data array, and two D type flip.flops for holding the contiguous picture element data from the first-in.first-out memory and outputting the contiguous picture element data to the typical value calculation means in synchronization with a clock signal from the control means dependent on the selection data and the carry signal.

16. An image enlargement and reduction processor according to claim 10; wherein the typical value calculating means includes interpolating means for producing the typical values using a linear interpolation method.

17. An image enlargement and reduction processor according to claim 16; wherein the interpolating means comprises a plurality of full adders.

18. An image enlargement and reduction processor according to claim 10; wherein the typical value selecting means includes a selecting circuit having a plurality of input terminals and an output terminal for outputting only one of the typical values dependent on the added picture data.

19. An image enlargement and reduction processor according to claim 10; wherein the control means has an input terminal for receiving the selection data and an input terminal for receiving the carry signal.

* * * * *